United States Patent
Horn et al.

(10) Patent No.: US 7,712,121 B2
(45) Date of Patent: May 4, 2010

(54) METHOD AND SYSTEM FOR CONTROLLING A PROCESSING OF VIDEO DATA

(75) Inventors: Uwe Horn, Aachen (DE); Andreas Schieder, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1473 days.

(21) Appl. No.: 09/780,416

(22) Filed: Feb. 12, 2001

(65) Prior Publication Data

US 2001/0022000 A1 Sep. 13, 2001

(51) Int. Cl.
*H04N 7/173* (2006.01)

(52) U.S. Cl. ............... 725/93; 725/96; 725/116; 725/146; 455/436; 455/425; 370/331

(58) Field of Classification Search ............ 725/2, 725/107, 91–97, 114–117, 146; 714/1, 2, 714/48, 746–752; 341/94, 173; 375/224, 375/286, 288; 455/8, 14, 423, 418–420, 455/425, 432.1, 432.2, 435.1–435.3, 436–444, 455/550.1, 553, 524–525, 517; 370/321, 370/328, 329, 331–339
See application file for complete search history.

(56) References Cited

U.S. PATENT DOCUMENTS

| | | | |
|---|---|---|---|
| 5,701,294 A | 12/1997 | Ward et al. | |
| 5,940,439 A | 8/1999 | Kleider et al. | |
| 6,094,427 A * | 7/2000 | Yi | 370/331 |
| 6,148,005 A * | 11/2000 | Paul et al. | 370/469 |
| 6,208,620 B1 * | 3/2001 | Sen et al. | 370/231 |
| 6,275,531 B1 * | 8/2001 | Li | 375/240.12 |
| 6,311,288 B1 * | 10/2001 | Heeren et al. | 714/4 |
| 6,421,733 B1 * | 7/2002 | Tso et al. | 709/246 |
| 6,421,735 B1 * | 7/2002 | Jung et al. | 709/250 |

(Continued)

FOREIGN PATENT DOCUMENTS

WO 00/05898 2/2000

OTHER PUBLICATIONS

*IEEE Transactions on Circuits and Systems for Video Technology*, US, IEEE Inc., New York, vol. 8, No. 3, Jun. 1, 1998, pp. 275,286, XP000767699, P. Cherriman et al., "Programmable H.263-Based Wireless Video Transceivers for Interference-Limited Environments".

(Continued)

*Primary Examiner*—Annan Q Shang
(74) *Attorney, Agent, or Firm*—Nixon & Vanderhye P.C.

(57) ABSTRACT

The application describes a method and system for controlling a processing of video data such that the video data may be transmitted over a connection in a communication network, where the connection employs a plurality of protocol layers. The processing of video data for transmission is performed at a first layer. A value or values of one or more transmission condition parameters indicative of transmission conditions in the network are acquired, where these transmission condition parameters are specific for a second layer provided lower than the first layer. Then one or more values of one or more video control parameters usable at the first layer are derived from the value of the least one transmission condition parameter and the processing of video data is performed in accordance with the derived one or more values.

30 Claims, 10 Drawing Sheets

U.S. PATENT DOCUMENTS

| | | | | |
|---|---|---|---|---|
| 6,470,378 | B1 * | 10/2002 | Tracton et al. | 709/203 |
| 6,473,399 | B1 * | 10/2002 | Johansson et al. | 370/229 |
| 6,490,627 | B1 * | 12/2002 | Kalra et al. | 709/231 |
| 6,512,778 | B1 * | 1/2003 | Jones et al. | 370/465 |
| 6,556,217 | B1 * | 4/2003 | Makipaa et al. | 345/667 |
| 6,594,241 | B1 * | 7/2003 | Malmlof | 370/329 |
| 6,633,536 | B1 * | 10/2003 | Suvanen | 370/216 |
| 6,643,813 | B1 * | 11/2003 | Johansson et al. | 714/748 |
| 7,149,228 | B1 * | 12/2006 | Kirla | 370/465 |
| 7,149,524 | B2 * | 12/2006 | Reynolds | 455/437 |
| 7,206,589 | B1 * | 4/2007 | Kall et al. | 455/466 |
| 7,233,596 | B2 * | 6/2007 | Tilander | 370/396 |
| 7,403,777 | B2 * | 7/2008 | Ohtani et al. | 455/436 |
| 7,403,778 | B2 * | 7/2008 | Reynolds | 455/436 |
| 7,433,686 | B2 * | 10/2008 | Kil | 455/426.1 |
| 2001/0047517 | A1 * | 11/2001 | Christopoulos et al. | 725/87 |
| 2006/0128386 | A1 * | 6/2006 | Ohtani et al. | 455/436 |

OTHER PUBLICATIONS

*International Conference on Communications (ICC)*, U.S., New York, IEEE, vol. -, 1994, pp. 571-575, XP000438978, M. Khansari et al., "Robust Low Bit-Rate Video Transmission Over Wireless Access Systems".

*IEEE Journal on Selected Areas in Communications*, vol. 17, No. 5, May 1999, Chi-Yuan Hsu et al., "Rate Control for Robust Video Transmission over Burst-Error Wifeless Channels".

*1999 IEEE International Conference on Image Processing*, Guy Côté et al., "Robust H.263 Video Communication Over Mobile Channels".

*Proc. of the IEEE Special Issue on Video for Mobile Multimedia*, 1999, Bernd Girod et al., "Feedback-Based Error Control for Mobile Video Transmission".

*Proceedings of the IEEE*, vol. 86, No. 5, May 1998, Yao Wang et al., "Error Control and Concealment for Video Communication: A Review".

*ACM/IEEE MobiCom '98*, Proceedings of the Fourth Annual ACM/IEEE International Conference on Mobile Computing and Networking, Oct. 25-30, 1998, Dallas, Texas, pp. 169-180, Anup Kumar Talukdar et al., "Rate Adaptation Schemes in Networks with Mobile Hosts".

*IEEE Transactions on Circuitry and Systems for Video Technology*, vol. 7, No. 1, Jun. 1997, C. Michael Sharon et al., "Modeling and Control of VBR H.261 Video Transmission over Frame Relay Networks".

*IEEE: Communications Society Microwave Theory and Techniques*, Munich, Germany, Oct. 1999, Andreas Schieder et al., "Performance Analysis of Realtime Applications in Mobile Packet Switched Networks".

*Funkschau*, No. 23, Oct. 29, 1999, Von Dr. Uwe Horn, "Videoübertragung in UMTS" (translation attached).

*Technical Report 333*, Department of Computer Science, Rutgers University, Jul. 1997, Pradeep Sudame and B.R. Badrinath, "On providing support for protocol adaptation in mobile wireless networks," http://www.cs.rutgers.edu/pub/technical-reports/dcstr-333.ps.Z.

* cited by examiner

METHOD AND SYSTEM FOR CONTROLLING A PROCESSING OF VIDEO DATA

TECHNICAL FIELD

The present invention is directed towards a method, system and unit for controlling a processing of video data such that said video data may be transmitted over a connection in a communication network, where said connection employs a plurality of protocol layers.

BACKGROUND

Video transmission or video streaming within communication networks, such as ISDN networks or the Internet has become an important application of such communications networks. In the future, packet oriented mobile networks like GPRS (General Packet Radio Service) and UMTS (Universal Mobile Telephone Standard) will be commonly used to connect mobile users to fixed communication networks like the above-mentioned ISDN networks or the Internet. It is therefore important to employ efficient and intelligent support of high quality video streaming into wireless radio networks.

A radio channel is a critical resource since its bandwidth is limited. Furthermore, it is a highly unreliable data channel, which requires special techniques to obtain a desired quality-of-service. Additionally, packet switched wireless networks provide variable user data rates depending on the number of concurrently ongoing communications within the same cell.

In order to support data applications (such as file transfer etc.), which require a reliable data link, a combination of forward error correction (FEC) and retransmission-based automatic repeat request (ARQ) is commonly used.

Compared to reliable data transmission, video streaming has rather different requirements. Namely, video streaming is usually less sensitive against data losses, but very delay sensitive. Data transmissions have opposite characteristics, i.e. they are very sensitive to data loss, but not very sensitive to delay. In other words, in the case of video streaming, the loss of certain parts will lead to a certain deterioration of picture quality, which is usually tolerable to a certain degree, but a strong delay (as for example caused by packet retransmission) will require complicated buffering mechanisms and make real-time transmission impossible. Therefore, video streaming is typically conducted by adjusting appropriate parameters, such that the data rate of the video transmitter (for example a video coder) can be easily adapted to the available transmission bandwidth. For example, the input rate of video data into a coder can be controlled, the coding mode can be controlled, or the amount of overhead employed for error correction, such as forward error correction, can be controlled. Existing wireless transmission schemes in mobile networks neither address the special requirements of video streaming nor the advantages resulting from the ability to control the bit rate of a video data source in an appropriate and efficient way.

PROBLEM

A number of mechanisms have been proposed for appropriately controlling a video source. One such suggestion is the use of receiver feedback information to control the data rate of a video transmitter, for example to avoid network congestion or to avoid high packet loss rate. This requires that the video receiver sends appropriate messages back to the video sender, where said messages indicate the conditions on the receiver side, for example the number of lost or damaged packets etc. Usually, operating a video transmitter at a low data rate, where only a small amount of packets are lost, gives a substantially better subjective picture quality than operating the transmitter at a high data rate where more packets are lost. This is true although the amount of correctly received packets is the same in both cases. Consequently, the sending control unit will typically reduce the data rate in response to message indicating increased packet loss.

An example of such a receiver feedback or end-to-end feedback system is known from the article "Rate Control for Robust Video Transmission over Burst-Error Wireless Channels" by Chi-Yuan Hsu et al, IEEE Journal on Selected Areas in Communications, vol. 17, No. 5, May 1999. This article proposes a mechanism which uses feedback information from the receiver and a channel model that makes use of the feedback information for adjusting the transmission rate.

However, sending end-to-end feedback information has several disadvantages, especially in a mobile or wireless network. Namely, feedback information can get lost or it reaches the sender with an unpredictable delay, the transmission of feedback information requires additional bandwidth, which is especially disadvantageous for radio channels, and the feedback information can only be based on the receiver's measurements and only implicitly reflects the network conditions.

Misinterpretation of the measured performance is possible. Moreover, there exist certain types of transmission that do not allow an end-to-end feedback, such as multicasting or broadcasting.

The article "Robust H.263 Video Communication Over Mobile Channels" by Guy Côté et al, 1999 IEEE International Conference on Image Processing (ISBN 0-7803-5470-2), discusses a mechanism that does not require a feedback channel. The concept proposed in this article is based on the assumption that two things are known, namely the error concealment method employed by the decoder, and the error rates of the network. Then the probability of a block being in error is calculated on what is referred to as the "channel average bit error rate" which as already mentioned, is assumed to be known. It is stated that information about the bit error rates can be obtained from the network or can be assumed a priori. In other words, this document proposes a video transmission scheme that assumes that the video transmitter knows the average bit error rate of the network. This implies some form of network feedback, but gives no further indication of how this is to be accomplished.

The two basic mechanisms of end-to-end feedback and network feedback are schematically shown in FIG. 6, where a control unit in a video transmitter controls the processing of video data for transmission over a network on the basis of such network feedback and receiver feedback.

SUMMARY

One object here is to provide an improved method and system for controlling the processing of video data, such that the video data may be transmitted over a connection in a communication network with improved quality, especially in the case of transmitting over a radio link.

The present invention specifically applies to communication networks that employ layer based communication, i.e. networks in which the data to be communicated is passed through stacks of protocol layers. In accordance with the present invention, the control of the processing of video data, for example the coding of video data, is controlled at a first layer, for example the application layer, while a value of one or more transmission condition parameters indicative of transmission conditions in the network is acquired at a lower layer, for example the link layer. Then the value or values of the lower layer transmission condition parameters are used for determining values of a video control parameter usable at the first layer. This can be done e.g. by providing the first layer with said one or more transmission condition values and then converting or mapping these transmission condition values into video control values. Finally, the processing of the video data at the first layer is conducted in accordance with the derived video control values.

Due to the use of parameter values indicative of the transmission conditions in the network for controlling the transmission of video data, the transmission quality can be improved without employing end-to-end feedback. The concept of the present invention makes use of transmission condition parameters already present in the network, namely at the lower layer. This is efficient, because no dedicated measurements that only relate to the video transmission control need to be implemented, and this provides a quick response, such that the video transmission control can be performed with little delay.

Preferably the values of the lower layer transmission condition parameters relate to the condition of a predetermined link at the link layer. In other words, the conditions associated with one of the links among the one or more links comprised in the connection that transports the video data are used as a basis for controlling the video transmission. This predetermined link can in principal be any link in the connection. Preferably the operation of acquiring transmission condition values is done with respect to a link that is expected to limit the transmission, such as a known or recognized bottleneck in a network, or a radio link. According to a preferred embodiment, the present invention is applied to the transmission of video data over connections that comprise a radio link, and the transmission conditions on the radio link are used as a basis for controlling the video transmission. It is especially advantageous if the lower layer transmission condition values are acquired at the sending side of said predetermined link, because then the feedback path to the video transmitter is short, which enables a video transmission control with good response to network conditions, e.g. far faster than end-to-end feedback. Moreover, if the transmission condition parameters are acquired on the sending side of the link, preferably close to or at the unit performing the video transmission, the network is not burdened with the transmission of feedback information, especially not over the radio link itself.

The control of the processing of video data can be performed in one unit, for example a terminal of the network, and the acquiring of the transmission condition values can be performed in another unit, for example a base station controller, or the video data processing control and the acquisition of transmission condition parameters can be performed in the same unit, for example a mobile station of a wireless network. In other words, the present invention can be implemented in a single unit, or can be spread out over a system.

More specifically, in the example of performing the video data processing control and the acquisition of transmission condition values in one mobile station, it is preferably the link layer peer handling the transmission of the radio link that provides transmission condition values associated with said radio link to the unit controller, who in turn derives video control parameters there from to be used for controlling the processing of the video data at the application layer.

More generally, the processing of video data can be done not only in a mobile station, but also in a base station of a wireless communication network, in an interworking function between such a wireless communication network and a fixed network, in a terminal device in such a fixed network, or in a proxy server provided in either the wireless communication network or the fixed network. As already mentioned, the acquiring of transmission condition values can be performed in the same unit or in another unit as the video data processing. This provide a high amount of flexibility, especially in view of arranging the system architecture.

For example, according to one preferred embodiment of the invention, the inventive concept is applied to the downloading of video data from a server in a given network, e.g. the Internet, to a mobile station (mobile telephone, portable computer, etc.). The transmission condition values are then acquired at the base station handling the radio link to the mobile station, and used by the server sending the video data or an intermediate proxy server, for controlling the transmission of video data.

The term processing of video data is to be understood broadly as relating to any type of processing that prepares video data for transmission, such as coding or transcoding, forward error correction or packetization. In other words, the present invention does not only apply to coding, but e.g. also to the preparation for transmission of stored coded video data. The example of transcoding as a type of processing is especially advantageous in the embodiment where video data is to be downloaded from a server or via a proxy.

Examples of transmission condition parameters whose values may be acquired are the current transmission delay, the bandwidth allocated for a specific user, the current or actual bit error rate, and the current frame erasure rate. Other examples that specifically relate to a link are the current or actual carrier to interference ratio and the current powerlevel. These are only examples and the present invention is not restricted thereto, as any type of transmission condition parameter may be employed.

The present invention is preferably applied to the transmission of such video data that is present in scalable form, e.g. having a base stratum and at least one enhancement stratum, where the decision regarding the inclusion or exclusion of the enhancement stratum in the transmitted video data is performed on the basis of the derived values of video control parameters. This provides a simplified processing of the video data, which in turn means that hardware and software for applying the invention need not be complicated.

The application of the present invention to the transmission of scalable video data is especially well combinable with the concept of downloading video data from a server or via a proxy server, because then the transcoding can be very simple. Namely, the server or proxy can then switch the enhancement stratum (or enhancement strata) on or off depending on the transmission conditions to the mobile station. This is very simple type of processing that does not require very much processing capacity.

The present invention is also applicable to other forms of scalable video representations, e.g. where two or more independently coded bitstreams of different bit rate are present (for example one bitstream having a low bitrate and one having a high bitrate) that both relate to the same video information, such that one suitable bitstream can be selected in accordance with the transmission conditions. This again provides the advantage of very simple processing, and has the additional advantage that the required decoders at the receiver need only handle a single bitstream.

The method of the present invention can be implemented in the form of software, hardware or combinations of both. As such, the present invention can also be realized as a computer program product and a storage medium for such a computer program product.

The present invention will more readily be understood by studying the following detailed description of embodiments, which are only given for the purpose of explanation and do not restrict the scope of the invention, and by referring to the enclosed figures, in which FIG. 1 shows a schematic structure for explaining the concept of layering and for explaining the present invention;

DETAILED DESCRIPTION

Figure 1:
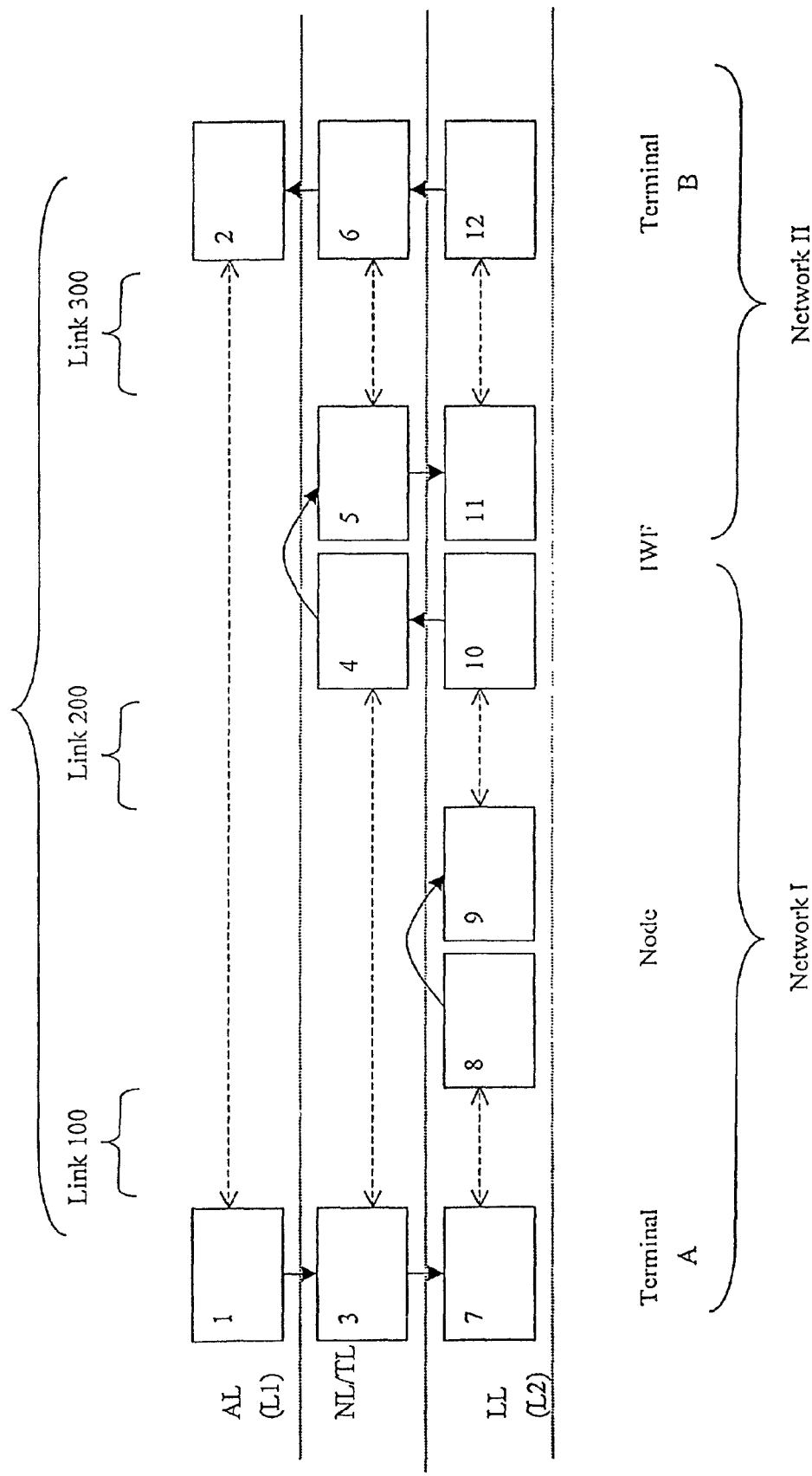

FIG. 1 is a schematic diagram for explaining the terminology used in the present application and for explaining the present invention. The concept of layering (OSI model) in communication is well known and shall therefore only be explained briefly. FIG. 1 shows a general example of a connection between a terminal A and a terminal B, where said connection is established through layer based communication. A protocol stack is a vertical hierarchy of protocols, where each protocol (or a group of protocols) fulfils a certain function. For example, a network protocol provides the means for forming a network, a transport protocol handles the transport of packets, or a link control protocol handles the traffic of packets across a certain type of link. A protocol or group of protocols performing a certain function constitute a layer. The example of FIG. 1 shows three layers, namely the application layer AL, the network layer/transport layer NL/TL and the link layer LL. The basic purpose of layering is to enable the independent performance of functions, mainly by making each layer transparent to the other layer. In other words, the box 1 represents a so-called peer at the application layer, which establishes a protocol session with the receiving peer 2 in terminal B in accordance with an application layer protocol. Such sessions are indicated by horizontal dash line double arrows between peers. When data is sent from terminal A to terminal B, the application layer AL passes data to the network layer/transport layer, represented by peer 3, which has a protocol session with peer 4 provided in an interworking function IWF between network I, in which terminal A is located, and network II, in which terminal B is located. Peer 3 fulfils a specific function, namely processing the data such that it may pass through the network, e.g. by appropriate framing (encapsulation) or segmentation. In general, the passing of data from a higher layer to a lower layer means that data packets from the higher layer are embedded into data packets of the lower layer, where embedding means encapsulation or segmentation. The flow of data through the layers is shown by full arrows in FIG. 1, where the shown example relates to the case of sending data from terminal A to terminal B. The concepts of encapsulation and segmentation are also well known and need not be explained further.

It should also be noted that FIG. 1 is only an example, and a larger or smaller number of layers may be provided.

In the example of FIG. 1 the connection between terminal A and terminal B comprises links 100, 200 and 300 between the terminal A and a node of network I (for example a base station controller BSC if network I is a wireless communication network), between the node and an interworking function IWF, and between the IWF and terminal B, respectively. Naturally, this is only an example, and a larger or smaller amount of links can be provided. For example, it is also possible that there is only a single link between link layer peer 7 and link layer peer 12. Each link is controlled in accordance with a respective protocol session indicated by the dashed double arrows between peers. If link 100 is a radio link in a wireless network, the protocol between peers 7 and 8 can e.g. be the radio link protocol RLP. The round full arrow in the node between peers 8 and 9 indicates a data relay, just as the round full arrow between peers 4 and 5 in the interworking function IWF also indicates a data relay.

As already noted above, the example of FIG. 1 is only a schematic example and, in this sense not a complete representation of an actual data transmission. For example, there will typically be provided a further layer below the link layer, namely the physical layer. This has not been shown in order to not make the representation too complicated. Due to the very concept of layering, each peer at any layer can anyhow essentially be oblivious to the actions and operations occurring at other layers.

When data is passed from a lower layer to a higher layer, the encapsulation or segmentation is reversed, such that the application layer peer 2 finally receives the data in the same form as it was passed downwards by the application layer peer 1 on the sending side. The same holds true for all other peer pairs shown, for example the network layer peer 4 receives the data in the same form as it was passed down from network peer 3 etc.

In accordance with the present invention, the peer 1 at the application layer is a processing element for processing video data to be sent over the connection to terminal B. This can e.g. consist in a video coding process of uncoded video data received from yet a higher layer or from a suitable generator of video data, or can consist in preparing stored coded video data for transmission. The term element is used in the context of the present application as referring to any suitable means for performing a given function, be it software, hardware or a combination of both. Therefore a peer in a communication is an example of an element for processing data or an element for controlling a link etc. The control of the processing, which occurs at the application layer, is performed with the help of values of transmission condition parameters acquired at one or more lower layers, for example the link layer or the network layer/transport layer. More specifically, a value or values of one or more transmission condition parameters present at one of the lower layer peers will be transferred to the controller responsible for controlling the video processing at the application layer, and this controller will derive one or more values of suitable video control parameters for performing the processing of video data to be sent.

The term processing is to be understood broadly, and can e.g. consist in coding, transcoding, performing forward error correction and/or performing packetization, without being restricted to these examples.

The terminal A and B shown in FIG. 1 can be any suitable device for sending and receiving video data, such as a telephone device (fixed or mobile) with video capabilities, a computer, a server in a network, etc. According to a preferred example, the source of video data is a server in a given network, for example the Internet, and the receiving terminal is a mobile station in a mobile network, where the transmission conditions on the radio link serve as a basis for acquiring video control values.

The action of deriving the video control values can be done in any suitable way, for example by a conversion algorithm or by a mapping operation using suitable tables that link transmission condition values with video control values. It is equally well possible that the conversion or mapping of transmission condition values into video control values is performed in the controller responsible for the control of the peer at the layer where the transmission condition values are acquired, in which case video control values are sent to the controller handling the processing of video data at the application layer. In the case that both peers involved reside in the same physical unit, for example a mobile station of a wireless network, the controller will typically be a single microprocessor that runs appropriate software modules handling the peer control at the respective layer, such that one module shall provide the other with appropriate parameter values. It is then also possible that e.g. the link layer control module shall send transmission condition values to a conversion module, that will in turn output video control values to the video processing control module. It is clear that this transfer of parameter values can be conducted in any suitable and desirable way, depending on the specific application.

If the element for acquiring the transmission condition values lies outside of the unit that handles the video data processing, a suitable mechanism for signalling the transmission condition values or converted video control values must be implemented. This can again be done in any suitable or desirable way, for example in the context of the layering scheme shown in FIG. 1, namely by passing the data in an appropriately framed form through the individual layers, or can be implemented outside of the layering scheme, for example by a dedicated signalling connection. This dedicated signalling connection can e.g. be established between the controller of the unit in which the peer acquiring the transmission condition values resides, and the controller of the unit in which the element for controlling the processing of video data resides.

It should be noted that although the present invention provides the using of information obtained at one layer in another layer, the basic concept of layer transparency is not altered. Namely, the lower layer peer only provides parameter values that are employed at a higher layer, but there is no direct interference over control signalling between peers at different layers. In other words, the lower layer peers do not control the higher layer peers.

Figure 2A:
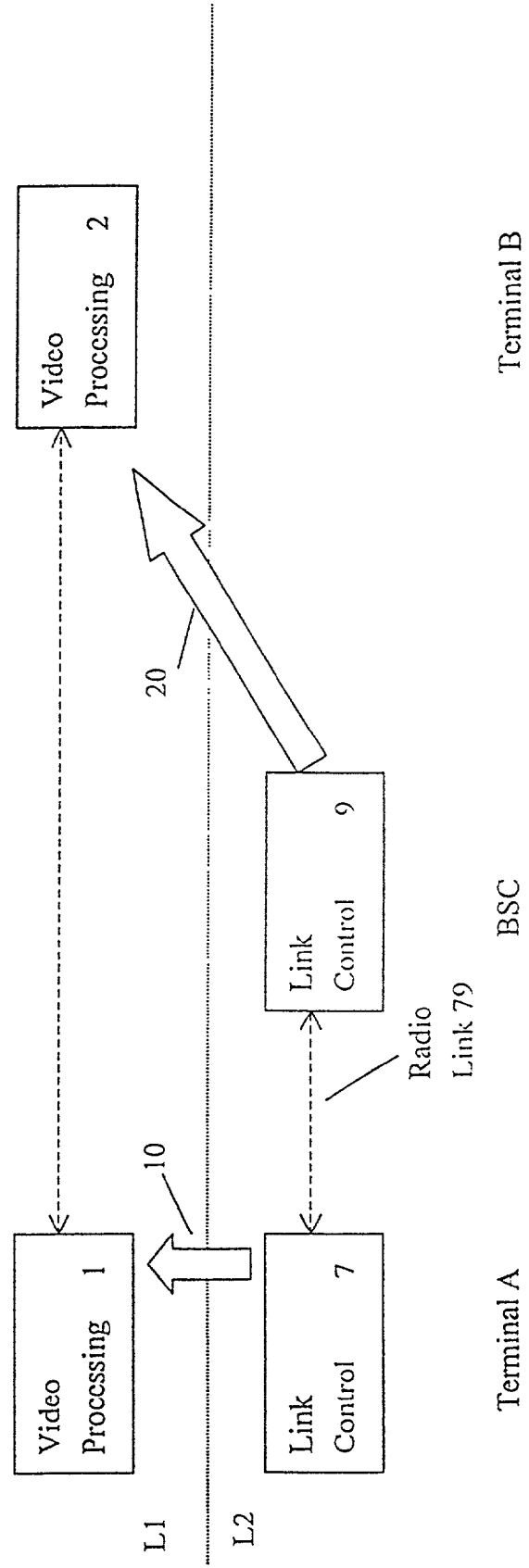
FIG. 2a shows an embodiment of the present invention.

FIG. 2a shows a preferred embodiment of the present invention, which uses the same reference numerals for the same or equivalent elements as FIG. 1, such that the description of these elements shall not be repeated. For the purpose of simplicity, FIG. 2a only shows an upper layer referred to as L1 and a lower layer referred to as L2. Preferably the upper layer L1 is an application layer and the lower layer L2 is a link layer. The peer entities 1 and 7 reside in a terminal A, which is a mobile station of a wireless communication network. In the uplink case, i.e. when the mobile terminal A sends video data into the network, the present invention is implemented in the example of FIG. 2a in such a way that the link control element 7 provides transmission condition values to the video processing element 1, where this transfer of data is symbolized by arrow 10. In the downlink case, i.e. when video data is sent to terminal A, the video processing in peer 2 of terminal B, which may reside in the same network as terminal A or in a distinct network, is performed on the basis of video control values derived from transmission condition values provided by the link control element 9. This link control element 9 preferably resides in the base station controller that establishes the radio link to terminal A. The reason for this is that it will typically be the radio link that provides the greatest restrictions for a transmission of the video data, such that it is advantageous to use the transmission condition values of the radio link as a basis for deriving video control values to be used in the video processing at the higher layer L1.

As can also be seen, the peer providing the transmission condition values is preferably on the sending side with respect to the data source, i.e. peer 7 when peer 1 is sending and peer 9 when peer 2 is sending. This avoids unnecessary feedback traffic, especially over the radio link 79.

According to a preferred embodiment, the terminal B is a server in a given network, e.g. the Internet, and the terminal A is a mobile station in a mobile network, that receives video data downloaded from the server B.

It may be noted that although FIG. 2a shows an example where the concept of the present invention is implemented in both the uplink and downlink direction, it is equally well possible that the concept of the present invention is only implemented in the downlink direction, or only implemented in the uplink direction. Therefore, as an example of only implementing the invention in the downlink direction, it is possible that terminal A is a mobile video viewing device (e.g. an appropriately programmed portable computer with an air interface), and terminal B is a server (e.g. in the Internet) containing video data that may be downloaded by the video viewing device A, where the device A has no uplink video transmission capability, such that no uplink transmission of video data takes place. Then the server B will control the processing (e.g. transcoding of stored coded video data) of the video data being sent to the mobile station A in accordance with transmission condition acquired by the radio link peer 9 in the base station controller handling the radio link to the mobile station A.

Figure 2B:
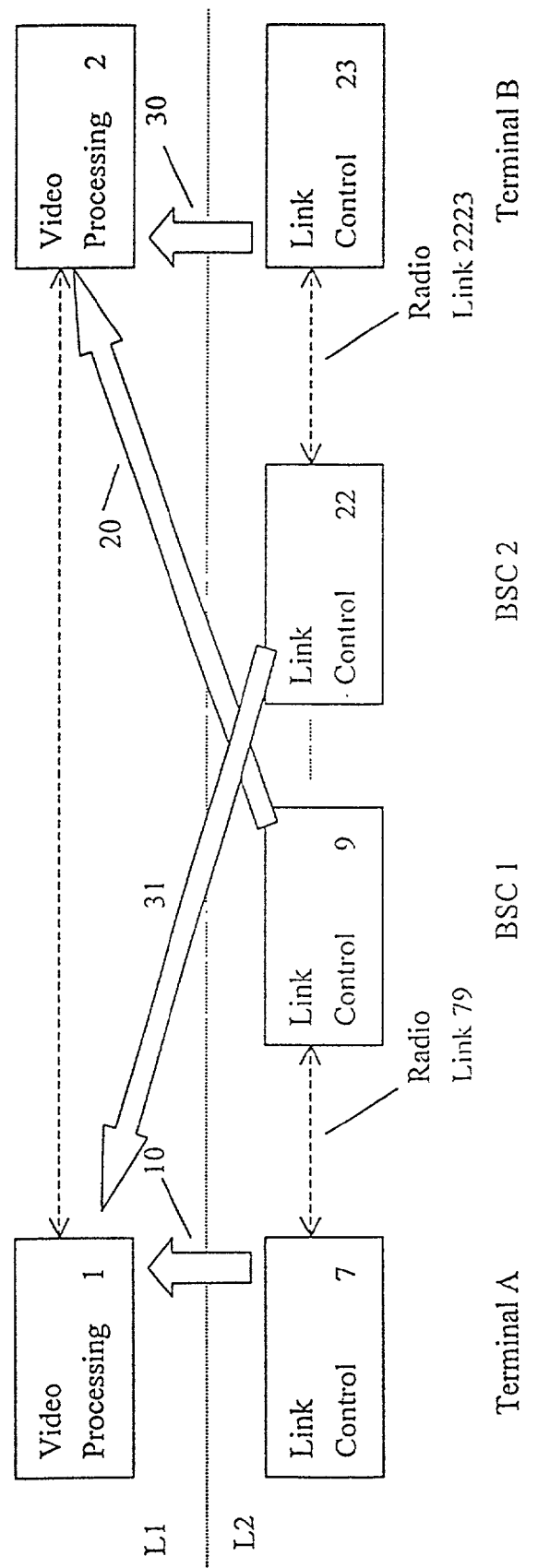
FIG. 2b shows another embodiment of the present invention.

It may be also noted that the present invention is not restricted to using the transmission condition values provided by one lower layer peer, but can also make use of transmission condition values provided by a plurality of lower layer peers, be it peers of the same layer or peers of different lower layers. An example of this is shown in FIG. 2b. FIG. 2b again shows terminals A and B, where in this case terminal B is also a mobile station. Then, the link control peer 7 and the link control 22 (which e.g. resides in the base station controller BSC2 communicating with terminal B) provide transmission condition values from which video control values are derived for controlling the video processing in peer 1. Equally, the link control peer 9 in the base station controller BSC1 communicating with terminal A provide transmission condition values for the video control in the video processing of peer 2 of terminal B, just as the link control peer 23 which resides in terminal B does. As can be seen from FIG. 2a and 2b, it is advantageous if the lower layer peer entity providing transmission condition values for a higher layer video data processing peer is provided on the sending side of the lower layer link, because this avoids unnecessary feedback traffic on the link from which transmission condition values are being acquired. This is especially important in the case of radio links, as it is highly advantageous to avoid any unnecessary bandwidth use on such radio links.

Figure 3A:
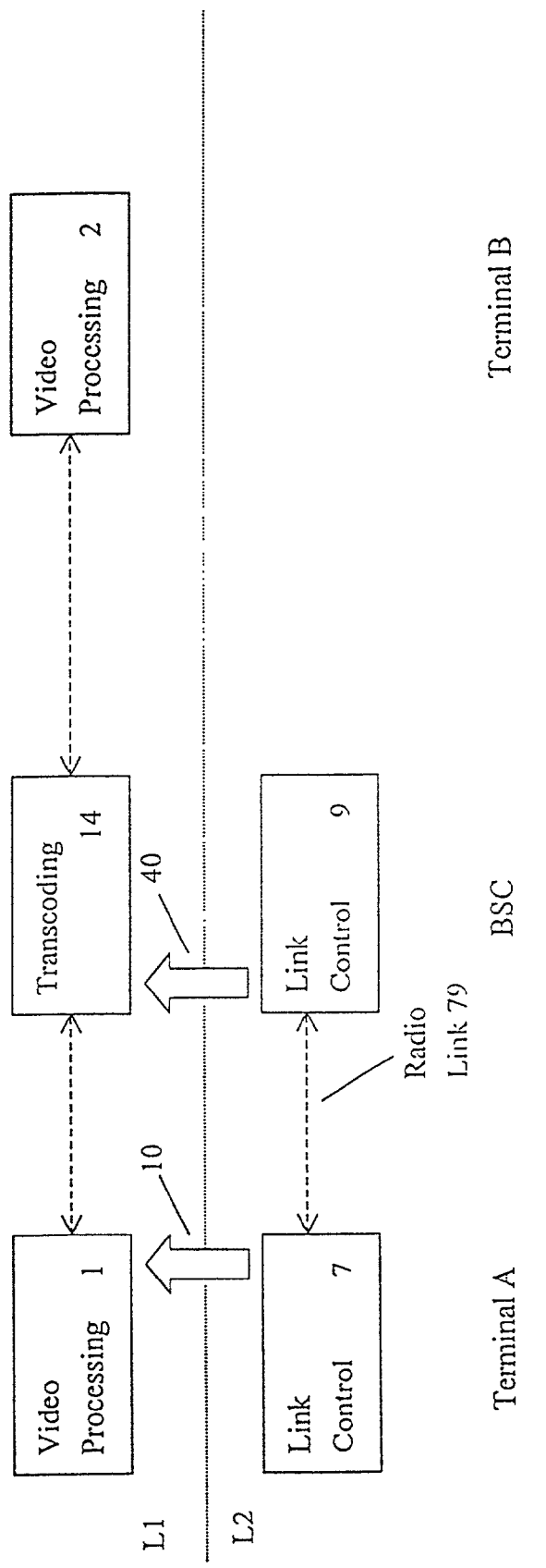
FIG. 3a shows another embodiment of the present invention.

Another embodiment of the present invention is shown in FIG. 3a. Again the same reference numerals are used for describing the same or equivalent elements as in FIG. 2a and 2b. The uplink case for sending video data from terminal A, which is again a mobile station in a wireless network, is identical to the situation in FIG. 2a. However, the downlink case for sending video data from terminal B to terminal A is different. More specifically, the peer 2 in terminal B is a conventional peer that provides conventional video processing. For example, terminal B can be a standard ISDN terminal. In the example of FIG. 3, the present invention is implemented by providing a transcoding peer 14 on layer L1 between terminal A and terminal B. This transcoding element can basically be provided in any network unit lying between terminal A and terminal B, such as an interworking function, a base station controller or in a proxy server. In the example of FIG. 3a the transcoding element is provided in the base station controller of the base station communicating with mobile terminal A. As can be seen, the example of FIG. 3a comprises sending the video data from terminal B in a conventional way to the base station, which comprises a link control peer 9 and a transcoding peer 14. Namely, the video data is passed from the link control peer 13 to the transcoding peer 14, where the transcoding is performed with video control values derived from transmission condition parameters provided by link control peer 9. These transmission condition values relate to the link 79 between peer 7 in terminal A and peer 13 in the base station. The advantage of the embodiment shown in FIG. 3a with respect to the embodiment shown in FIG. 2a is that no modification of terminal B is necessary. This is especially advantageous, if terminal B resides in a different network than terminal A, for example terminal B is a standard fixed terminal in a PSTN network or ISDN network, and terminal A is a mobile station in a wireless network. Namely, it is then possible to use the invention, even it is not implemented in the terminal at the other end of the connection.

The example of FIG. 3a shows a case in which the transmission condition values relate to the radio link between terminal A and the base station controller. As can be seen, the transcoding can be performed in direct response to the transmission condition of the radio link both in the uplink and the downlink direction, because the transmission condition values are in both cases acquired in the same unit in which the video processing is performed. This achieves a fast response and thereby very efficient video processing control.

The present invention can however also be implemented differently when employing an intermediate unit between the two end terminals, i.e. is not restricted to implementing the inventive concept in the base station. The intermediate unit can also be e.g. the interworking function between the two different networks, or can a proxy server provided in the network of terminal A or the network of terminal B. If one of the networks is a wireless network, then the proxy is preferably provided in the wireless network.

Figure 3B:
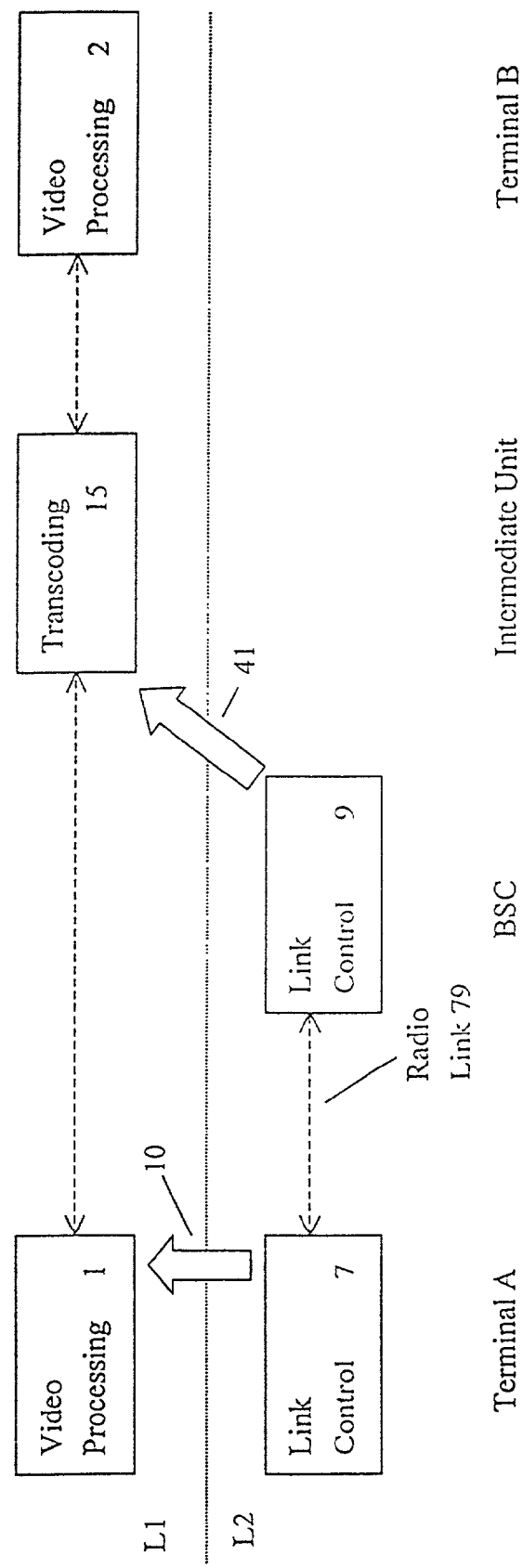
FIG. 3b shows another embodiment of the present invention.

This is shown in FIG. 3b, where the element 9 for acquiring transmission condition values is associated with the radio link towards terminal A, and therefore resides in the base station communicating with terminal A, whereas the upper layer (L1) element 15 responsible for transcoding the video data being sent is provided in an intermediate unit, e.g. the interworking function IWF or a designated proxy server.

In the examples of FIG. 3a and 3b, it was explained that the intermediate unit could be an interworking function, a base station controller, or a proxy server. When implementing the present invention in an interworking function or a base station controller of a wireless network, it is necessary to adapt all of these units in the wireless network. Although this is advantageous with respect to a system in which all terminals in networks outside of the wireless network (such as the shown terminal B in a fixed network) need to be adapted to the present invention, it nonetheless leads to a certain expense.

Figure 4:
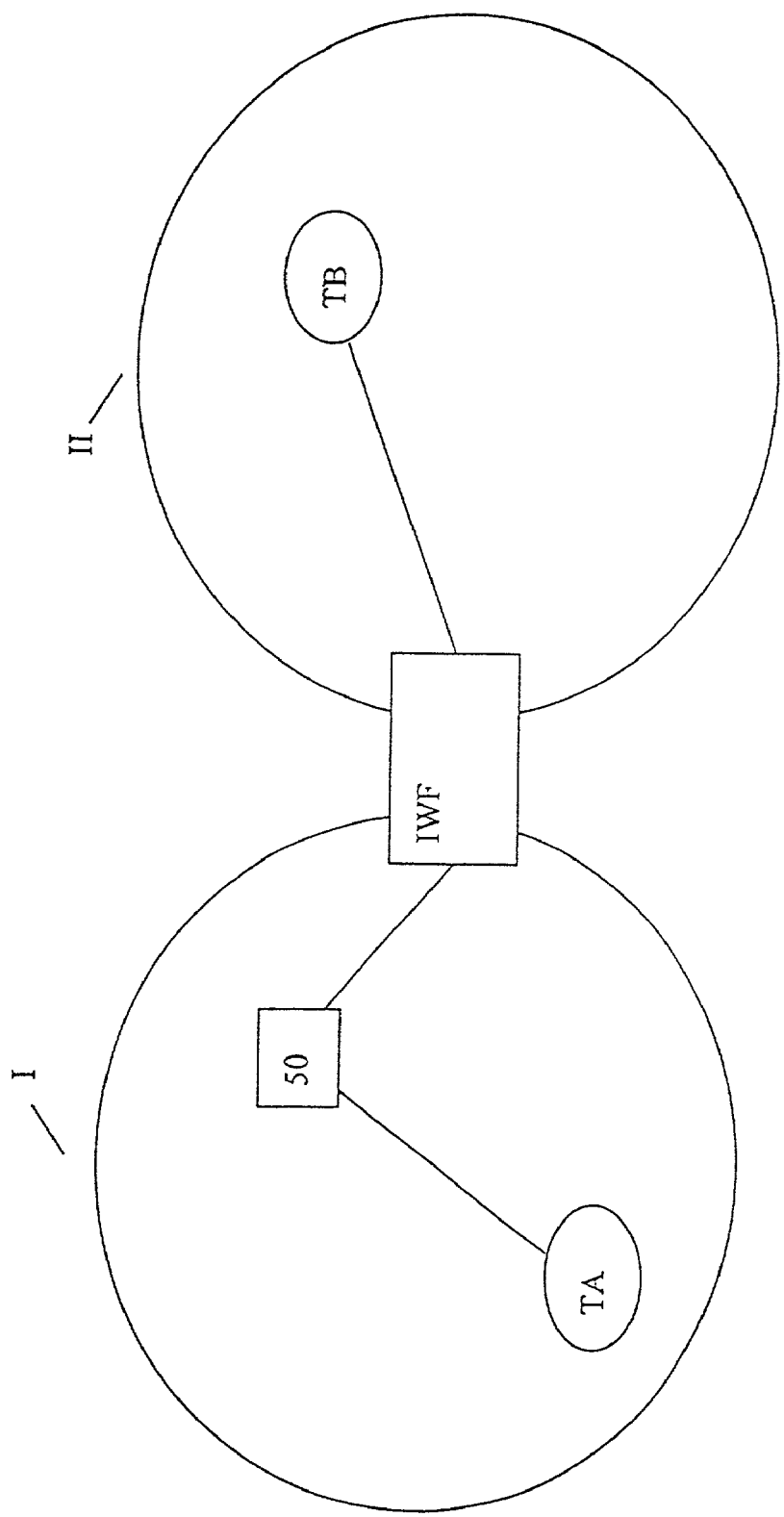
FIG. 4 shows a schematic representation of two networks employing a proxy server.

An alternative solution consists in implementing the invention for downlink traffic in a dedicated proxy server, where this proxy server is preferably provided in the wireless network to which mobile station A belongs. This is shown schematically in FIG. 4. In FIG. 4 network I is a mobile network and network II is a fixed network. The network II can be an ISDN network, where video source terminal TB can e.g. be an ISDN device with video telephone capability, or network II can be a data transmission network such as the Internet, and video source terminal TB can e.g. be server for downloading video data to receiving terminal TA. The interworking function between the two networks is arranged such that calls containing video streams are directed to proxy 50, which then plays the role of the intermediate unit shown in FIG. 3b. This provides the possibility of implementing the present invention in only a few units associated with the mobile network I. For example, the proxy server could be located in the mobile switching centres of mobile network I. As shown in FIG. 3b, it is preferable in this case that the acquisition element for acquiring transmission condition values is located in the base station controllers associated with each mobile switching centre, such that the transmission condition values relate to the respective radio link to the mobile stations. However, the video processing, (e.g. transcoding) will be performed in a centralized manner in the proxy at the mobile switching centre.

It is however equally well possible to provide the proxy 50 in network II. For example, if TB is a video server or web server in the Internet, 50 can be a proxy server that is also located in the Internet, and is adapted to handle video transmissions from any server in the Internet that are directed towards mobile units in network I. As in the case described above, such an arrangement provides the advantage that only a few servers, namely the proxy servers, need to be adapted to the present invention, whereas all of the remaining servers could remain unchanged.

Regarding the transmission condition parameters for which values are acquired, it may be noted that any such parameters that in any way reflect the transmission condition are suitable for use in the present invention. This includes past, present and future transmission conditions. For example, the current bit error rate on a specified link (e.g. the radio link) is a present condition, where a handoff information in conjunction on conditions or characteristics of the cell into which the handoff shall take place, relates to a future condition. The term parameter is to be understood broadly as relating to any suitable type of information. This also applies to the use of the term parameter in connection with the video processing control.

Therefore any information available in the communication network that relates to the past, present or future lower layer transmission condition could be made available as a basis for deriving video control values. As already mentioned previously, the transmission condition values are preferably acquired or obtained with respect to a specific peer communication at a specific layer, preferably with respect to a predetermined link at the link layer, and examples of such transmission condition parameters are the current or actual transmission delay, the bandwidth allocated for a specific user, (in networks that provide such a function, such as GPRS or UMTS, or in networks providing an HSCSD (High Speed Circuit Switched Data) service), the current or actual bit error rate, and the current or actual frame erasure rate. If the transmission condition parameters are acquired with respect to radio link, then further possible transmission condition parameters are the current carrier to interference (C/I) ratio on the radio link, or the current power-level (e.g. for wideband CDMA-channels).

These are only examples, and many more transmission condition parameters can be employed. In the following a few more precise examples of possible lower layer transmission condition parameters shall be given using GSM/GPRS and UMTS as examples. In other words, these examples relate to the application of the present invention in a context of a wireless network using GSM/GPRS and UMTS.

The GSM measurement report generated by a mobile station to assist the handover process is a further example for transmission condition parameters usable in the present invention. This measurement report is generated at least once every second and reflects the link quality in terms of the base station's signal strength perceived at the mobile station. In order to be employed in the context of the present invention, the mobile station needs to be modified in such a way that this report is not only packed into a RIL3-LL message, but additionally provided to the video processing module in control of the video processing at the application layer.

Another example of a transmission condition parameter are the GSM uplink state flag (USF) used in GPRS. The USF signals the mobile station when it is allowed to access uplink resources. It is possible to derive the amount of bandwidth currently available for a particular mobile station by counting how often uplink state flags are issued for this particular mobile station. It is therefore a measure for the network load.

In the case of a HSCSD communication, it is beneficial to signal the current number of allocated time slots to the application. This is especially necessary in case of configuration changes due to e.g. load balancing performed by the network.

Another very important example is the employment of handover information as a transmission condition parameter. Especially when performing a handover to a cell providing a different capacity, the information can be used to specifically adapt the coding or transcoding process to the new conditions. For example, if the handover information indicates that a new cell provides a higher capacity, the video coding can be adapted to provide a higher data rate, which provides higher picture quality. The knowledge of a handover and the accompanying conditions are especially important in the case of a so-called inter-system handover, for example from UMTS to GSM or E-GPRS (Enhanced-GPRS or Edge-GPRS) to GPRS.

In a UMTS system applying a WCDMA (wideband CDMA) wireless channel, the information relating to the transmit power level, which is provided by the base station, can be used to control the video coding process on the higher layer. If the maximum power level has been reached, only the reduction of the bit rate can be used to keep the envisaged link quality level. Thus, when signalling such conditions to the application process, the video processing could be configured to produce less data.

Figure 5:
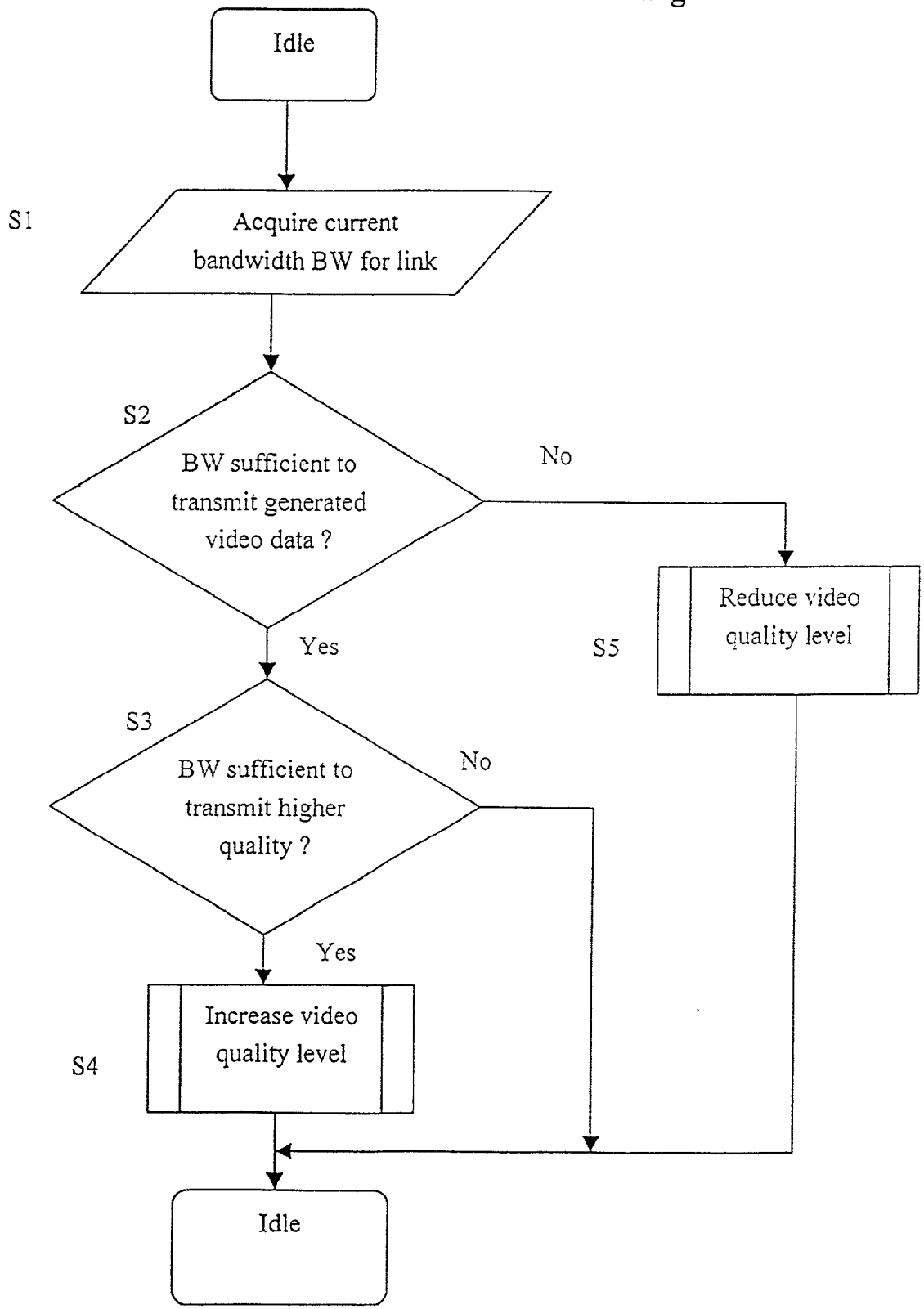
FIG. 5 shows a flow chart for explaining a simple control mechanism usable in the context of the present invention.
Figure 6:
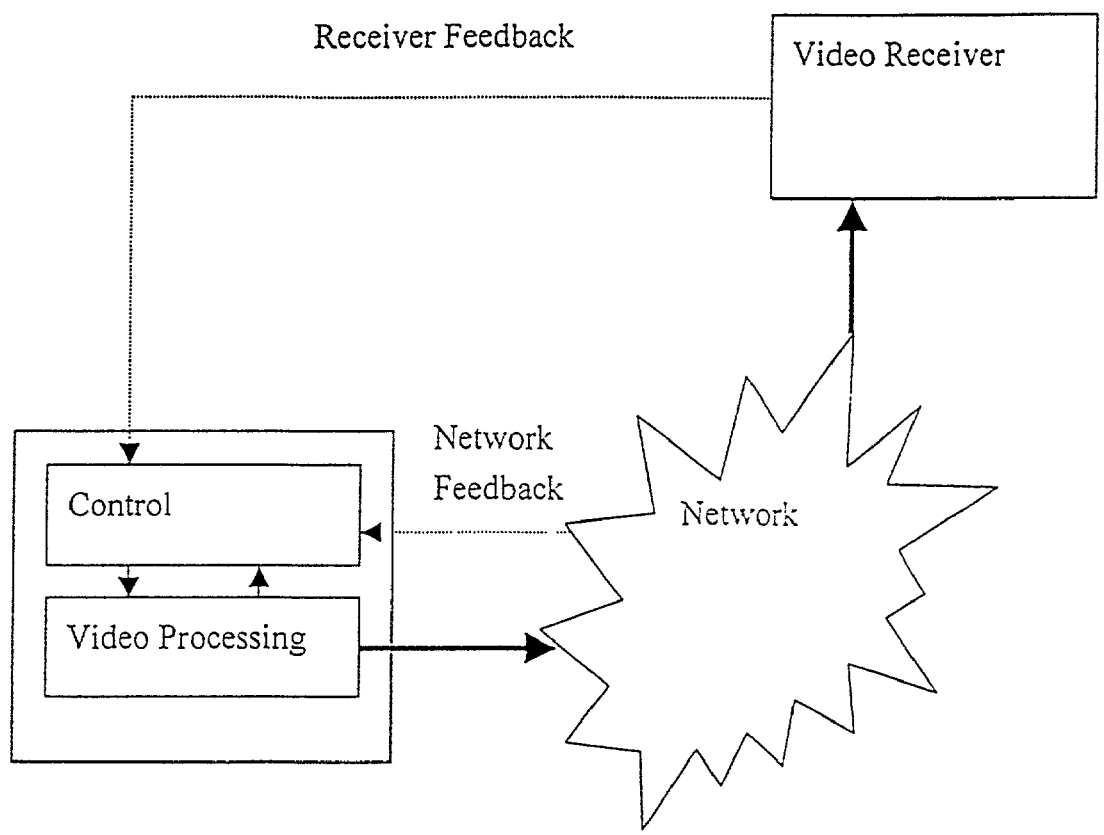
FIG. 6 is a schematic representation explaining the concepts of receiver feedback and network feedback.

A simple example of how the processing of video data for transmission can be controlled on the basis of transmission condition values obtained from lower layers is shown in FIG. 5. It maybe noted that the process shown in FIG. 5 is implemented at the layer L1 handling the video data processing, i.e. in the module controlling the video data processing. This module receives values of the bandwidth allocated for a link as transmission condition values. Step S1 symbolizes the acquisition of the current bandwidth allocated for a link in the connection. In step S2 it is determined if the acquired current bandwidth is sufficient for transmitting a generated video data stream. If the answer is no, then the process branches to step S5, where the video quality level and the amount of generated video data is reduced. On the other hand, if the bandwidth is sufficient, then the procedure passes to step S3, in which it is determined if the current bandwidth is sufficient to transmit a higher video quality. If this is the case, then the process passes to step S4, in which the video quality level and the amount of generated data is increased.

As can be seen from the example of FIG. 5, the video control values derived from the transmission condition values can be broadly understood as any type of information suitable for controlling the video processing, such as command values for increasing or decreasing the quality and/or quantity of transmitted video data.

Figure 7:
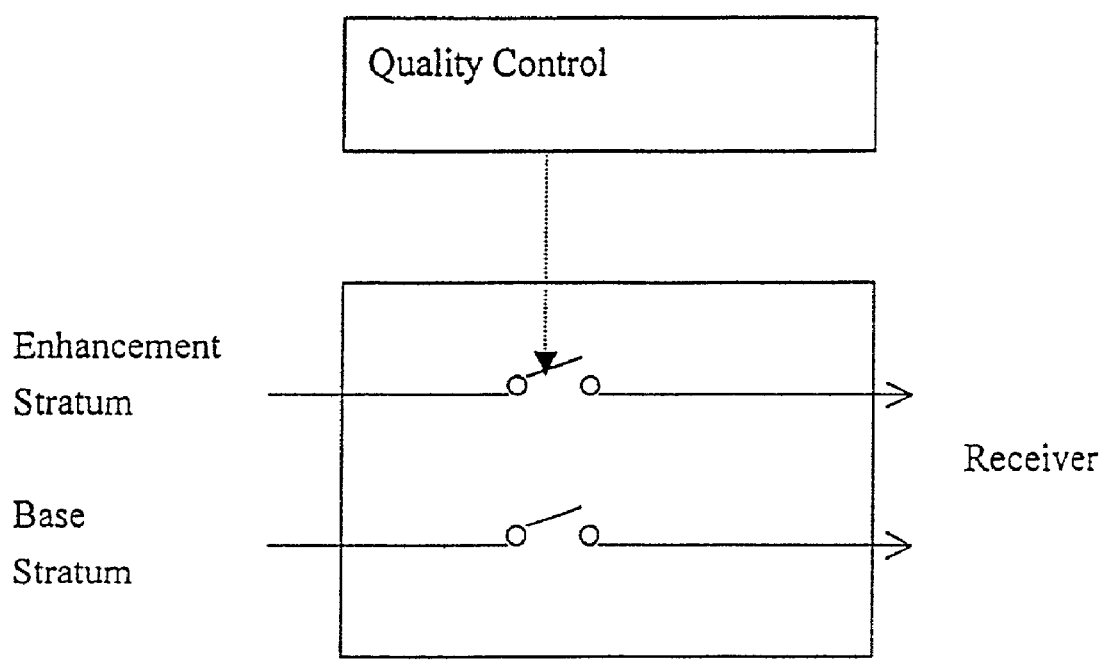
FIG. 7 is a schematic representation for explaining an example of scalable video data.

According to a preferred example of the present invention, the concept of the present invention is applied to the transmission of video data that is provided in scalable form. A well known example of scalability is explained briefly in connection with FIG. 7. Scalability in this example implies that the coded video is provided in a base stratum (sometimes also referred to as a base layer, but in order to avoid confusion with the above-described protocol layers, the term stratum is used) and at least one enhancement stratum, where the base stratum carries a basic amount of encoded video data, and the enhancement stratum carries a further amount. The basic stratum provides a basic picture of predetermined quality and the transmission of the base stratum will typically only require a predetermined amount of bandwidth. If a larger amount of bandwidth is available, then the picture quality can be improved by including the data amount in the enhancement stratum into the transmission, or if the amount of bandwidth decreases, then the enhancement stratum can be removed from a transmission.

The specific advantage of scalability is the simplicity of adapting the video picture quality to the data rate offered by a connection, or of adapting the data rate to a desired video picture quality.

The application of the present invention to the transmission of scalable video data is especially well combinable with the concept of using an intermediate unit (see FIG. 3a or 3b), such as the described proxy server, because then the transcoding performed by the intermediate unit is very simple, for example as explained in connection with FIG. 5. Namely, the intermediate unit can then switch the enhancement stratum (or enhancement strata) on or off depending on the transmission conditions to the mobile station. This is very simple type of processing that does not require very much processing capacity.

Figure 8:
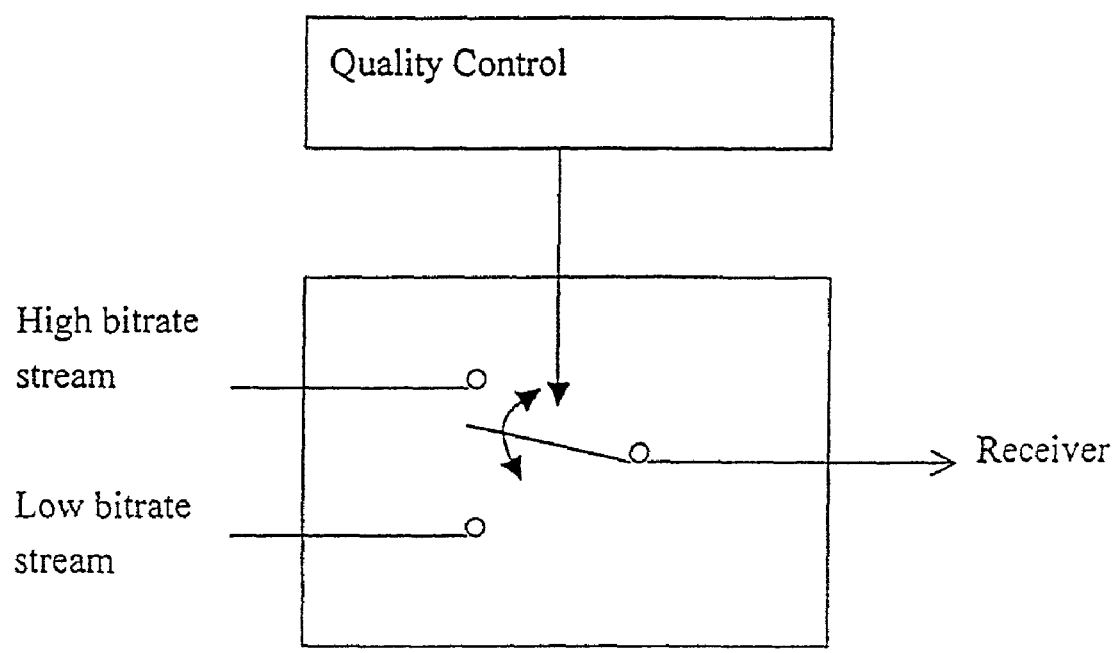
FIG. 8 is a schematic representation for explaining another example of scalable video data.

The above described example of scalability being achieved by using one base stratum and one or more enhancement strata is only one example of a scalable video representation. The present invention is also applicable to other forms of scalable video representations, e.g. where two or more independently coded bitstreams of different bit rate are present that both relate to the same video information, such that one suitable bitstream can be selected in accordance with the transmission conditions. This is shown schematically in FIG. 8. The example of FIG. 8 shows one bitstream having a low bitrate and one having a high bitrate, where the quality control selects the high bit rate video stream or the low bit rate video stream, depending on the transmission conditions.

This again provides the advantage of very simple processing and low processing capacity, and has the additional advantage that the required decoders at the receiver need only handle a single bitstream.

Although the present invention has been described on the basis of preferred embodiments, it is to be understood that the

The invention claimed is:

1. A method for controlling a processing of video data including coding or transcoding of video data such that said video data may be transmitted over a connection in a communication network from a source to a receiver, said connection employing a plurality of protocol layers, said method including:

performing said controlling of the processing of video data at a first application layer in said source, acquiring from a network control element separate from said source and said receiver a value of one or more transmission condition parameters indicative of transmission conditions in the network, where said one or more transmission condition parameters are specific for a second layer provided lower than said first application layer, deriving one or more values of one or more video control parameters from said value of said at least one transmission condition parameter, providing to said first application layer said derived one or more values, and performing at said first application layer said controlling of the processing of video data including coding or transcoding of video data in accordance with said derived one or more values, wherein said communication network includes a wireless communication network, said connection comprises a radio link for transporting a mobile communication including video data between a mobile station in said wireless communication network and a radio base station in said wireless communication network, said mobile station being currently located in a first cell coverage area, and said one or more transmission condition parameters include information pertaining to one or more handover conditions associated with handing over the mobile communication to a second cell coverage area, and wherein the information pertaining to one or more handover conditions includes information relating to a capacity of the second cell for adapting the coding or transcoding of video data in accordance with that information.

2. The method of claim 1, wherein said one or more values of said one or more transmission condition parameters are acquired at said second layer on a sending side of said predetermined link.

3. The method of claim 1, wherein said second layer is a link layer.

4. The method of claim 1, wherein said communication network is a wireless communication network, and said method is applied to the processing of video data in one or more of a mobile station in said wireless communication network, a base station in said wireless communication network, an interworking function between said wireless communication network and a fixed network, a terminal device in said fixed network, and a proxy server provided in said wireless communication network or said fixed network.

5. The method of claim 1, wherein said processing of video data comprises the forward error correction of said video data.

6. The method of claim 1, wherein said processing of video data comprises the packetization of said video data.

7. The method of claim 1, wherein said one or more transmission condition parameters are selected from a group consisting of the current transmission delay, the bandwidth allocated for a specific user, the current bit error rate, and the current frame erasure rate.

8. The method of claim 1, further comprising transmitting said video data in scalable form by having a base stratum and at least one enhancement stratum, and by deciding on the inclusion or exclusion of said enhancement stratum in the transmitted video data on the basis of the derived one or more values of said one or more video control parameters.

9. The method of claim 1, further comprising transmitting said video data in scalable form by having at least two independent bitstreams of video data, and by selecting between said at least two independent bitstreams on the basis of the derived one or more values of said one or more video control parameters, the selected bitstream being the transmitted video data.

10. The method of claim 1, wherein said one or more transmission condition parameters include one or more additional transmission condition parameters selected from a group including a current transmission delay on the radio link, a bandwidth allocated for a specific user on the radio link, a current bit error rate on the radio link, a current frame erasure rate, a current carrier to interface ratio on the radio link, and a current power-level on the radio link.

11. A computer program product loadable into a computer-readable memory for a digital computer device, including software code portions for performing the method of claim 1 when said computer program product is run on said computer device.

12. A computer-readable storage medium storing the computer program product of claim 11 stored thereon.

13. A transmitting system for transmitting video data over a connection in a communication network from a source to a receiver that employs a plurality of protocol layers, comprising:

a processing element in said source arranged to process video data to be transmitted at a first application layer including to code or transcode video data, an acquisition element arranged to acquire from a network control element separate from said source and receiver a value of one or more transmission condition parameters indicative of a transmission condition associated with said connection, said one or more transmission condition parameters being specific for a second layer lower than said first layer, and a deriving element for deriving one or more values of one or more video control parameters from said value of said one or more transmission condition parameters, said deriving element being arranged to provide said derived one or more values to said processing element at said first application layer, where said processing element is arranged to control the processing of video data including coding or transcoding video data at said first application layer based on said derived one or more values, wherein said communication network includes a wireless communication network, said connection comprises a radio link for transporting a mobile communication including video data between a mobile station in said wireless communication network and a radio base station in said wireless communication network, said mobile station being currently located in a first cell coverage area, and said one or more transmission condition parameters include information pertaining to one or more handover conditions associated with handing over the mobile communication to a second cell coverage area, and wherein the information pertaining to one or more handover conditions includes information relating to a capacity of the second cell for adapting the coding or transcoding of video data in accordance with that information.

14. The transmitting system according to claim 13, wherein said acquisition element is a part of a control element provided for controlling the transmission of data over a predetermined link forming part of said connection, where said one or more transmission condition parameters are indicative of a transmission condition associated with said predetermined link.

15. The transmitting system of claim 14, wherein said one or more transmission condition parameters are selected from a group consisting of the current transmission delay on the link, the bandwidth allocated for a specific user on the link, the current bit error rate on the link, and the current frame erasure rate on the link.

16. The transmitting system of claim 13, wherein said acquisition element is arranged such that said one or more values of said one or more transmission condition parameters are acquired at said second layer on a sending side of said radio link.

17. The transmitting system of one of claim 13, wherein said second layer is a link layer.

18. The transmitting system claim 13, wherein said processing element is provided in one or more of a mobile station in said wireless network, a base station in said wireless network, an interworking function between said wireless network and a fixed network, a terminal device in said fixed network, and a proxy server provided in said wireless network or said fixed network.

19. The transmitting system of claim 18, wherein said processing element, said acquisition element and said element for deriving values of video control parameters are all provided in one unit.

20. The transmitting system of claim 18, wherein said acquisition element is provided in a different unit than said processing element.

21. The transmitting system of claim 20, wherein said processing element is provided in one of a terminal device of said fixed network and a proxy server, and said acquiring element is provided in a base station of said wireless network.

22. The transmitting system of claim 13, wherein said processing element is arranged to perform forward error correction of said video data.

23. The transmitting system of claim 13, wherein said processing element is arranged to perform packetization of said video data.

24. The transmitting system of claim 13, wherein said one or more transmission condition parameters include one or both of the current carrier to interface ratio on the radio link and the current power-level on the radio link.

25. The transmitting system of claim 13, wherein said processing element is arranged to control the transmission of said video data in scalable form by having a base stratum and at least one enhancement stratum, and is arranged to decide on the inclusion or exclusion of said enhancement stratum in the transmitted video data on the basis of the derived one or more values of said one or more video control parameters.

26. The transmitting system of claim 13, wherein said processing element is arranged to control the transmission of said video data in scalable form by having at least two independent bitstreams of video data, and is arranged to select between said at least two independent bitstreams on the basis of the derived one or more values of said one or more video control parameters, the selected bitstream being the transmitted video data.

27. The transmitting system of claim 13, wherein said one or more transmission condition parameters include one or more additional transmission condition parameters selected from a group including a current transmission delay on the radio link, a bandwidth allocated for a specific user on the radio link, a current bit error rate on the radio link, a current frame erasure rate, a current carrier to interface ratio on the radio link, and a current power-level on the radio link.

28. A transmitting unit for transmitting to a receiver video data over a connection in a communication network that employs a plurality of protocol layers, comprising:

a processing element arranged to process video data to be transmitted at an application first layer including to code or transcode video data, an acquisition element arranged to acquire from a network control element separate from said transmitting unit and said receiver a value of one or more transmission condition parameters indicative of a transmission condition associated with said connection, said one or more transmission condition parameters being specific for a second layer lower than said first application layer, and a deriving element for deriving one or more values of one or more video control parameters from said value of said one or more transmission condition parameters, said deriving element being arranged to provide said derived one or more values to said processing element at said first application layer, where said processing element is arranged to control the processing of video data including coding or transcoding video data at said first application layer based on said derived one or more values, wherein said communication network includes a wireless communication network, said connection comprises a radio link for transporting a mobile communication including video data between a mobile station in said wireless communication network and a radio base station in said wireless communication network, said mobile station being currently located in a first cell coverage area, and said one or more transmission condition parameters include information pertaining to one or more handover conditions associated with handing over the mobile communication to a second cell coverage area, and wherein the information pertaining to one or more handover conditions includes information relating to a capacity of the second cell for adapting the coding or transcoding of video data in accordance with that information.

29. The transmitting unit of claim 28, wherein said unit is one of a mobile station in said wireless network, a base station in said wireless network, an interworking function between said wireless network and a fixed network, a terminal device in said fixed network, and a proxy server provided in said wireless network or said fixed network.

30. The transmitting unit of claim 28, wherein said one or more transmission condition parameters include one or more additional transmission condition parameters selected from a group including a current transmission delay on the radio link, a bandwidth allocated for a specific user on the radio link, a current bit error rate on the radio link, a current frame erasure rate, a current carrier to interface ratio on the radio link, and a current power-level on the radio link.

* * * * *

UNITED STATES PATENT AND TRADEMARK OFFICE
CERTIFICATE OF CORRECTION

PATENT NO. : 7,712,121 B2  Page 1 of 1
APPLICATION NO. : 09/780416
DATED : May 4, 2010
INVENTOR(S) : Horn et al.

It is certified that error appears in the above-identified patent and that said Letters Patent is hereby corrected as shown below:

On Page 2, item (56), under "OTHER PUBLICATIONS", in Column 1, Line 7, delete "Wifeless" and insert -- Wireless --, therefor.

In Column 15, Line 26, in Claim 17, after "system of" delete "one of".

In Column 15, Line 28, in Claim 18, delete "system" and insert -- system of --, therefor.

Signed and Sealed this

Twenty-seventh Day of July, 2010

David J. Kappos
*Director of the United States Patent and Trademark Office*